W. S. HANCOCK.
WHEEL HUB.
APPLICATION FILED MAR. 24, 1913.
1,169,898. Patented Jan. 25, 1916.
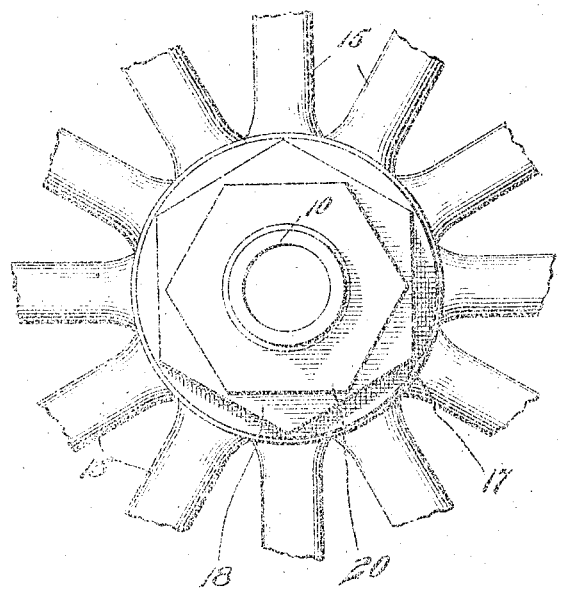
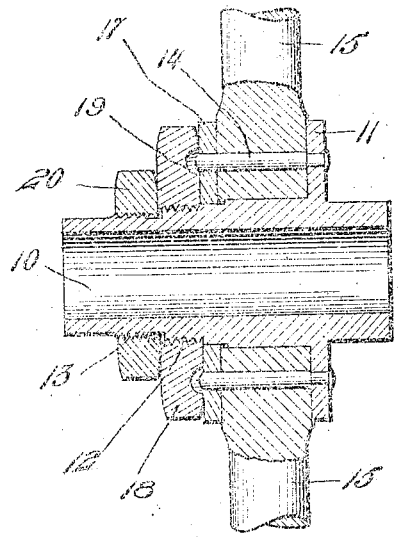
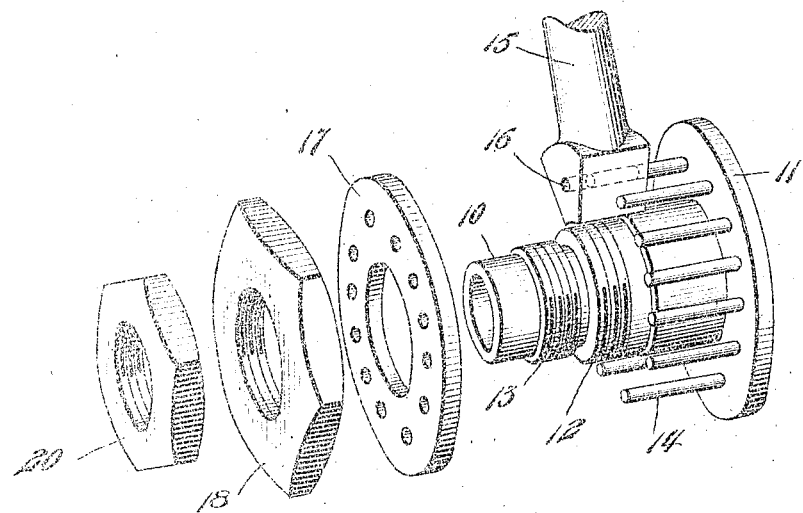
Inventor
Winfield S. Hancock
by Foster Freeman Watson ____
Attorneys
Witnesses

UNITED STATES PATENT OFFICE.

WINFIELD S. HANCOCK, OF WASHINGTON, DISTRICT OF COLUMBIA, ASSIGNOR OF THREE-FIFTHS TO AUGUSTA V. MITCHELL, OF WASHINGTON, DISTRICT OF COLUMBIA.

WHEEL-HUB.

1,169,398. Specification of Letters Patent. Patented Jan. 25, 1916.

Application filed March 24, 1913. Serial No. 756,471.

*To all whom it may concern:*

Be it known that I, WINFIELD S. HANCOCK, a citizen of the United States, residing at Washington, District of Columbia, have invented certain new and useful Improvements in Wheel-Hubs, of which the following is a specification.

This invention relates to vehicle wheels and more particularly to improvements in the hub construction whereby a hub is provided which may be readily disassembled for the purpose of replacing a spoke whenever desired.

The novel features of the invention will be apparent from the following description taken in connection with the accompanying drawings, in which:

Figure 1 is a side elevation of a hub embodying my invention. Fig. 2 is a transverse section thereof. Fig. 3 is a perspective view of the parts of the hub and showing the manner of disassembling and removing a spoke.

Referring to the drawings, 10 indicates the usual tubular body member of the hub which may be mounted on the axle of the vehicle in any preferred manner. The body member 10 is preferably formed with an integral radial flange 11 and has on its exterior the threaded portions 12 and 13, the portion 13 being preferably of smaller diameter than the portion 12.

The flange 11 has secured thereto a series of axially projecting pins 14 which are adapted to have arranged thereon the spokes 15 of the wheel, the spokes being preferably provided with openings 16 through their inner ends to receive the pins 14. By this arrangement it is possible, as shown in Fig. 3, to remove any of the spokes by sliding it off the pin 14 on which it is arranged.

The spokes are secured in position on the pins 14 by means of a plate 17 which engages the outer surface of the body member 10 and bears against the side of the spokes 15 and coöperates with the flange 11 to hold the spokes against longitudinal movement on the pins. The plate 17 is held in position by means of a nut 18 which engages the screw threaded portion 12 of the body member, this nut being provided with a circular groove 19, in the side adjacent the plate 17, to receive the ends of the pins 14 and thereby prevent the nut from engaging the pins. The nut 18 may be secured in position by any suitable means and for this purpose I have shown a nut 20 which is arranged on the threaded portion 13 of the body member.

The threaded portion 13 is shown in the drawings as being smaller in diameter than the threaded portion 12 in order to lessen the cost of construction of the hub and also provide for quickly removing the nut 18, since the latter can be slipped over the threaded portion 13 when it has been disconnected from the portion 12. It will be understood that the portions 12 and 13 may be made of the same diameter without departing from my invention.

It is believed that the operation of removing and inserting a spoke will be readily understood from the foregoing and therefore a detail description would be superfluous.

Having thus described the invention what is claimed as new is:

In a wheel hub, the combination of a body member having a radially extending flange formed integrally therewith, a plurality of axially extending pins secured to said flange, spokes engaging said pins, an axially movable plate having openings therein through which said pins may extend to coöperate with said flange to hold the spokes against movement, a nut having threaded engagement with said body member and adapted to secure said plate in position, said nut having a groove in the side thereof adjacent said plate for receiving the ends of said pins, and means for securing said nut against rotation.

In testimony whereof I affix my signature in presence of two witnesses.

WINFIELD S. HANCOCK.

Witnesses:
JOHN M. COIT,
ARTHUR L. BRYANT.